(12) United States Patent
Kagarlitsky et al.

(10) Patent No.: US 12,670,664 B2
(45) Date of Patent: *Jun. 30, 2026

(54) TEMPORALLY COHERENT VOLUMETRIC VIDEO

(71) Applicant: TAKE-TWO INTERACTIVE SOFTWARE, INC., New York, NY (US)

(72) Inventors: Vsevolod Kagarlitsky, Ramat Gan (IL); Shirley Keinan, Tel Aviv (IL); Amir Green, Mitzpe Netofa (IL); Michal Heker, Tel Aviv (IL); Michael Birnboim, Holon (IL); Gilad Talmon, Tel Aviv (IL)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 297 days.

This patent is subject to a terminal disclaimer.

(21) Appl. No.: 18/110,487

(22) Filed: Feb. 16, 2023

(65) Prior Publication Data

US 2024/0282054 A1 Aug. 22, 2024

(51) Int. Cl.
*G06T 13/20* (2011.01)
*G06T 15/04* (2011.01)
*G06T 17/20* (2006.01)

(52) U.S. Cl.
CPC .............. *G06T 17/20* (2013.01); *G06T 13/20* (2013.01); *G06T 15/04* (2013.01)

(58) Field of Classification Search
CPC .......... G06T 17/20; G06T 13/20; G06T 15/04
See application file for complete search history.

(56) References Cited

U.S. PATENT DOCUMENTS

| | | | |
|---|---|---|---|
| 11,308,675 B2 | 4/2022 | Wang et al. | |
| 2018/0068178 A1* | 3/2018 | Theobalt ................. | G06T 13/40 |
| 2019/0213439 A1* | 7/2019 | Liu .......................... | G06N 3/08 |
| 2021/0279840 A1* | 9/2021 | Chi .......................... | G06T 3/40 |
| 2021/0350621 A1 | 11/2021 | Bailey et al. | |
| 2022/0321830 A1* | 10/2022 | Niklaus ................ | H04N 7/0135 |
| 2023/0419507 A1* | 12/2023 | Planche ................... | G06T 7/90 |

(Continued)

FOREIGN PATENT DOCUMENTS

| | | | |
|---|---|---|---|
| CN | 114863035 A | * | 8/2022 |
| KR | 102468493 B1 | | 11/2022 |

(Continued)

OTHER PUBLICATIONS

PCT International Search Report for International Application No. PCT/IL2023/050164, mailed Jun. 22, 2023, 3pp.

(Continued)

*Primary Examiner* — Chante E Harrison
(74) *Attorney, Agent, or Firm* — Orrick, Herrington & Sutcliffe LLP

(57) ABSTRACT

A method for finding a deformation field transforming a source frame of a volumetric video into a target frame of a volumetric video comprising steps of building a texture implicit function for said target frame and training a neural network to generate said deformation field between said source frame and said target frame, said texture implicit function for said target frame being a texture matching loss for said neural network.

18 Claims, 3 Drawing Sheets

(56) References Cited

U.S. PATENT DOCUMENTS

| | | | | |
|---|---|---|---|---|
| 2024/0161335 A1* | 5/2024 | Zhou | .................... | G06F 40/279 |
| 2024/0282046 A1* | 8/2024 | Kagarlitsky | ............ | G06T 13/20 |

FOREIGN PATENT DOCUMENTS

| | | | |
|---|---|---|---|
| WO | 2022121220 A1 | | 6/2022 |
| WO | WO-2024171176 A1 | * | 8/2024 |
| WO | WO-2024171177 A1 | * | 8/2024 |

OTHER PUBLICATIONS

PCT Written Opinion for International Application No. PCT/IL2023/050164, mailed Jun. 22, 2023, 4pp.

* cited by examiner

1100

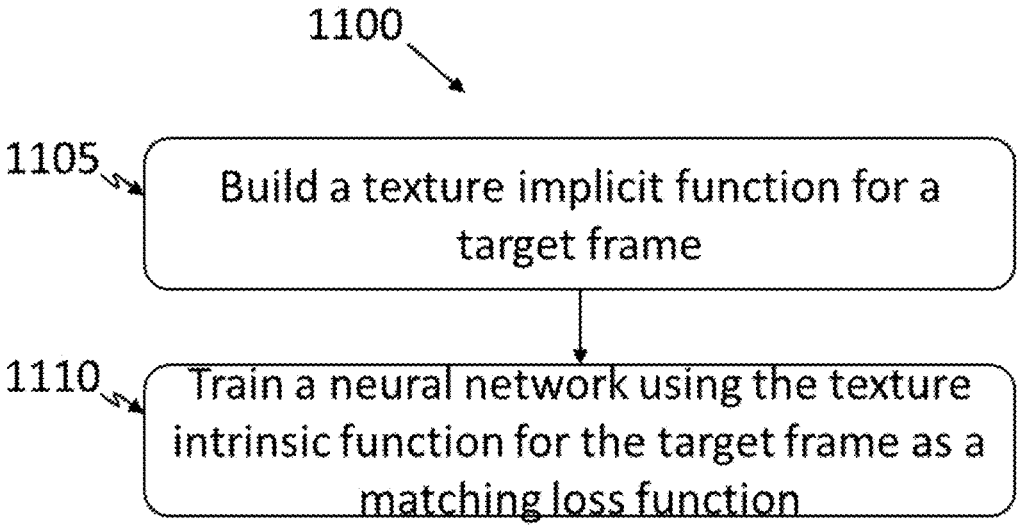

1105    Build a texture implicit function for a target frame

1110    Train a neural network using the texture intrinsic function for the target frame as a matching loss function

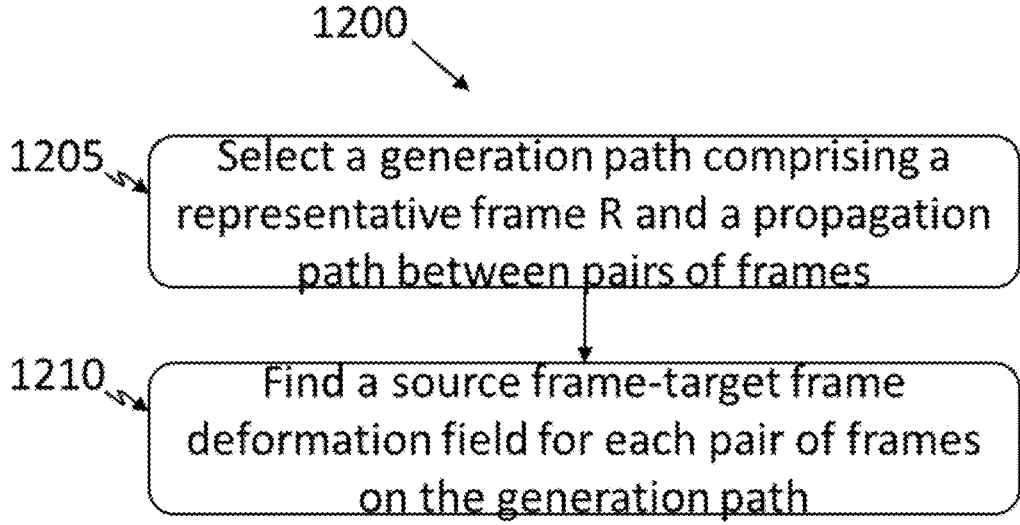

1205    Select a generation path comprising a representative frame R and a propagation path between pairs of frames 1210    Find a source frame-target frame deformation field for each pair of frames on the generation path

Fig. 4

TEMPORALLY COHERENT VOLUMETRIC VIDEO

FIELD OF THE INVENTION

The present invention generally pertains to a system and method for generating a volumetric video in which all frames are temporally coherent.

BACKGROUND OF THE INVENTION

In a volumetric video, 3D objects move and deform between frames of the volumetric video. Typically, each 3D object is described by a textured mesh, which typically has three parts:

(a) A geometry, typically comprising two parts, a list of vertices and their locations in space and a list of polygons (typically triangles) which is a list comprising, for each polygon, its vertices. The list of polygons is typically called the index list.

Typically, a plurality of polygons will share a vertex. For example, triangular polygons have 3 vertices. If triangles are arranged in a circle in which all 6 triangles share a central point, one vertex will be shared by 6 triangles and each of the other six vertices will be shared by two triangles.

The topology of an object is the connection between polygons, and is typically described by the index list.

(b) A 2D texture, typically stored as an atlas, an image where the surface of the object is distorted to enable detail where it is needed. For example, in an atlas, typically, a face will be enlarged and a shirt reduced in size compared to their geometric size. Furthermore, parts that are contiguous in the geometry need not be contiguous in the atlas. For example, the hands may be in one area of the atlas, adjacent to the face, while the shirt is in another area of the atlas, adjacent to a hat the person is wearing.

(c) A UV mapping, which maps each vertex to a coordinate in the atlas.

An object can both move and deform between frames; movement and deformation altering the locations of the vertices in the geometry. The size, shape and possibly color of items in the atlas can, but does not always, alter between frames.

If the same topology can be used for two or more consecutive frames, the frames are "temporally coherent" and only the locations of the vertices (or the difference in location between the first frame and subsequent frames) needs to be stored; the index list needs to be stored only for the first frame.

Very often, the UV mapping will also be the same between the first frame and subsequent frames, so that it, too, will need to be stored only for the first frame of the temporally coherent frames.

In the prior art, several techniques can be used to generate a temporally coherent sequence of frames.

For example, each frame in the volumetric video can be meshed independently. Then an attempt will be made to "drag", or deform, the definition of the object(s) in one frame to match the definition of the object(s) in another frame, often by using a deformation field (DF), although other techniques can be used. The geometry of the object(s) can be described by a mesh, by voxels, by a point cloud, by a signed distance field (SDF), by a NERF or by any other conventional means of defining the geometry of object(s).

The mesh(es) represent the object(s) themselves, whereas the voxels, point cloud, SDF or NERF represents a space with object(s) in it.

Rather than meshing each frame, more basic inputs, such as a point cloud, can be used. In this case, the output of one frame, a mesh, is dragged to match the input of another frame. For non-limiting example, a mesh can be dragged to match a point cloud or differential rendering can be applied. In differential rendering, a mesh can be dragged so that the projection of the mesh on the rgb cameras yields results matching the projection of the point cloud on the rgb cameras.

Again, the dragging is typically, but not always, done using a DF. In this case, there is no need to calculate a new mesh for every frame.

However, both methods usually fail to give a DF that holds over many frames; when a frame is reached where the technique fails and it is not possible to drag a previous frame onto the new frame, a new temporally coherent sequence must be initiated so that the number of frames temporally coherent with the same first frame is much smaller than the number of frames in the volumetric video.

Therefore, periodically, often after only a few frames, a new definition of the object(s) such as, but not limited to, a new list of vertices, a new index list, a new UV mapping and, possibly, a new atlas must be stored. Typically, the transition from a frame described by one topology to a frame described by a second topology is less smooth than a transition between two frames described by the same topology because of the difference in the topology of the meshes. For example, problems can arise because of "thermal noise"; small disturbances occurring between frames when defining the surfaces of objects. In addition, at present, no good method is known for smoothing out high frequency noise in the location of vertices over time.

In the prior art, since temporal coherence typically breaks down after a relatively small number of frames in the volumetric video, storage of a new topology and, often, a new atlas, must be stored every time temporal coherence breaks down. Therefore, there are typically discontinuities in surface location at the transition between the last frame of one series with temporal coherence and the first frame of a series with another temporal coherence. The number of new topologies makes it difficult to insert a volumetric video into an animation pipeline. Artifact fixing must be done for each new topology and, in addition, augmentation must typically be re-done for each new topology.

It is therefore a long felt need to provide a system whereby it is unnecessary to repeatedly store an index list or a UV mapping for a volumetric video, where there are few or no discontinuities in the volumetric video, where it is not difficult to insert the volumetric video into an animation pipeline, where artifact fixing is not difficult and where augmentation need not be redone for each new topology.

SUMMARY OF THE INVENTION

It is an object of the present invention to disclose a system and method for generating a volumetric video in which all frames are temporally coherent.

It is another object of the present invention to disclose a method for finding a deformation field transforming a source frame of a volumetric video into a target frame of a volumetric video comprising steps of:

building a texture implicit function for said target frame; and training a neural network to generate said deformation field between said source frame and said target frame, said texture implicit function for said target frame being a texture matching loss for said neural network.

It is another object of the present invention to disclose the method as described above, additionally comprising at least one of the following steps:

a. selecting said 3D model representation to be a signed distance field;

b. generating a lighting implicit function for said target frame, and using said lighting implicit function as a lighting matching loss for said neural network; or c. generating a semantics implicit function for said target frame, and using said semantics implicit function as a semantics matching loss for said neural network.

It is another object of the present invention to disclose the method as described above, additionally comprising a step of, no deformation field being findable between said source frame and said target frame, selecting an intermediate frame and generating a source-intermediate deformation field between said source frame and said intermediate frame using a texture implicit function for said intermediate frame, generating an intermediate-target deformation field between said intermediate frame and said target frame, and generating a source-target deformation field from said source-intermediate deformation field and said intermediate-target deformation field.

It is another object of the present invention to disclose the method as described above, additionally comprising steps of generating a 3D model implicit function for said target frame from a 3D model representation of said frame, and using said 3D model implicit function as a geometry matching loss for said neural network.

It is another object of the present invention to disclose the method as described above, additionally comprising steps of:

selecting a generation path, said generation path comprising:

a representative frame R; and a propagation path between pairs of frames (source frame k, target frame k) where target frame k of a frame in said generation path becomes source frame k for a next frame in said propagation path; and applying the method for finding a deformation field transforming a source frame of a volumetric video into a target frame of a volumetric video to each pair of frames on said generation path.

It is another object of the present invention to disclose the method as described above, additionally comprising at least one of the following steps:

a. said propagation path comprising a member selected from a group consisting of R-frame propagation where R frame propagation is propagation from representative frame R to all other frames, or moving propagation where moving propagation is propagating (representative frame R to frame n1), propagating (frame n1 to frame n2) and repeating propagation (frame nx to frame ny) until all frames are linkable, no two of said at least one generation path having both the same representative frame R and the same propagation path;

b. having a plurality of generation paths, and for each of said target frame k in said volumetric video, using the deformation fields from said plurality of generation paths having said target frame k to find an averaged deformation field having said target frame k, thereby generating an averaged volumetric video;

c. for a 3D object representation not comprising a mesh, for said representative frame R; applying an algorithm configured to generate a textured mesh for each object in said 3D object representation of R, and transforming said texture and said mesh of said representative frame R into texture and mesh for all other frames in said volumetric video via said source frame k-target frame k deformation fields;

d. storing topology only for representative frames.

It is another object of the present invention to disclose the method as described above, additionally comprising a step of storing texture only for representative frames.

It is another object of the present invention to disclose the method as described above, additionally comprising a step of selecting said representative frame R from frames comprising a characteristic selected from a group consisting of: a frame comprising a predetermined object, a frame comprising a predetermined pose, a predetermined frame in said volumetric video, or any combination thereof.

It is another object of the present invention to disclose the method as described above, additionally comprising steps of storing or downloading said volumetric video as a frame-and-deformation field file, said frame-and-deformation field file comprising all between-frame deformation fields and, for each of said generation path, storing topology and texture for representative frame R.

It is another object of the present invention to disclose the method as described above, additionally comprising a step of storing said representative frame as a textured mesh.

It is another object of the present invention to disclose a non-transitory computer-readable medium comprising computer-executable instructions which, when executed by a computing device, cause the computing device to carry out a method for finding a deformation field transforming a source frame of a volumetric video into a target frame of a volumetric video, the method comprising steps of:

building a texture implicit function for said target frame; and training a neural network to generate said deformation field between said source frame and said target frame, said texture implicit function for said target frame being a texture matching loss for said neural network.

It is another object of the present invention to disclose the non-transitory computer-readable medium as described above, wherein the computer-executable instructions are additionally configured, when executed, to perform at least one of:

a. select said 3D model representation to be a signed distance field;

b. generate a 3D model implicit function for said target frame from a 3D model representation of said frame, and use said 3D model implicit function as a geometry matching loss for said neural network; or c. generate a semantics implicit function for said target frame, and use said semantics implicit function as a semantics matching loss for said neural network.

It is another object of the present invention to disclose the non-transitory computer-readable medium as described above, wherein the computer-executable instructions are additionally configured, when executed, to generate a lighting implicit function for said target frame, and use said lighting implicit function as a lighting matching loss for said neural network.

It is another object of the present invention to disclose the non-transitory computer-readable medium as described above 1, wherein the computer-executable instructions are additionally configured, when executed, no deformation field being findable between said source frame and said target frame, to select an intermediate frame and generate a source-intermediate deformation field between said source frame and said intermediate frame using a texture implicit function for said intermediate frame, generate an intermediate-target deformation field between said intermediate frame and said target frame, and generate a source-target deformation field from said source-intermediate deformation field and said intermediate-target deformation field.

It is another object of the present invention to disclose the non-transitory computer-readable medium as described above, wherein the computer-executable instructions are additionally configured, when executed, to:

select a generation path, said generation path comprising:

a representative frame R; and a propagation path between pairs of frames (source frame k, target frame k) where target frame k of a frame in said generation path becomes source frame k for a next frame in said propagation path; and apply the method for finding a deformation field transforming a source frame of a volumetric video into a target frame of a volumetric video to each pair of frames on said generation path.

It is another object of the present invention to disclose the non-transitory computer-readable medium as described above, wherein the computer-executable instructions are additionally configured, when executed, to perform at least one of:

a. said propagation path comprising a member selected from a group consisting of R-frame propagation where R frame propagation is propagation from representative frame R to all other frames, or moving propagation where moving propagation is propagating (representative frame R to frame n1), propagate (frame n1 to frame n2) and repeat propagation (frame nx to frame ny) until all frames are linkable, no two of said at least one generation path having both the same representative frame R and the same propagation path;

b. have a plurality of generation paths, and for each of said target frame k in said volumetric video, use the deformation fields from said plurality of generation paths having said target frame k to find an averaged deformation field having said target frame k, thereby generating an averaged volumetric video; or c. for a 3D object representation not comprising a mesh, for said representative frame R; apply an algorithm configured to generate a textured mesh for each object in said 3D object representation of R, and transform said texture and said mesh of said representative frame R into texture and mesh for all other frames in said volumetric video via said source frame k-target frame k deformation fields;

d. store topology only for representative frames.

It is another object of the present invention to disclose the non-transitory computer-readable medium as described above, wherein the computer-executable instructions are additionally configured, when executed, to store texture for representative frames only.

It is another object of the present invention to disclose the non-transitory computer-readable medium as described above, wherein the computer-executable instructions are additionally configured, when executed, to select said representative frame R from frames comprising a characteristic selected from a group consisting of: a frame comprising a predetermined object, a frame comprising a predetermined pose, a predetermined frame in said volumetric video, or any combination thereof.

It is another object of the present invention to disclose the non-transitory computer-readable medium as described above, wherein the computer-executable instructions are additionally configured, when executed, to store or download said volumetric video as a frame-and-deformation field file, said frame-and-deformation field file comprising all between-frame deformation fields and, for each of said generation path, store topology and texture for representative frame R.

It is another object of the present invention to disclose the non-transitory computer-readable medium as described above, wherein the computer-executable instructions are additionally configured, when executed, to store said representative frame as a textured mesh.

It is another object of the present invention to disclose a method for generating a temporally coherent plurality of frames in a volumetric video, comprising steps of:

finding a deformation field transforming a source frame of a volumetric video into a target frame of a volumetric video comprising steps of:

building a texture implicit function for said target frame; and training a neural network to generate said deformation field between said source frame and said target frame, said texture implicit function for said target frame being a texture matching loss for said neural network;

applying said deformation field to said source frame, thereby generating a deformed source frame;

selecting a plurality of frames in said volumetric video;

selecting a first source frame in said plurality of frames;

repeating the steps of finding said deformed source frame for each target frame, said finding of said deformed source frame following one of the following paths:

finding a first deformed source frame from said first source frame; and each subsequent source frame being a deformed source frame from a previous pair of frames; or each of said target frames being a deformation of said first source frame.

It is another object of the present invention to disclose the method as described in any of the above, additionally comprising a step of selecting a solver for optimization from a group consisting of at least one non-linear optimizer, at least one neural network or any combination thereof.

It is another object of the present invention to disclose the method as described in any of the above, additionally comprising a step of applying a solver to at least one frame of the temporally coherent plurality of frames to add metadata or improve a quality of the temporally coherent plurality of frames.

It is another object of the present invention to disclose the method as described in any of the above, additionally comprising generating optimized rigging and skinning, where optimization is finding locations of bones and relations between bones and a resulting surface definition that best matches a target surface definition for a deformed source frame in a plurality of target frames, where the resulting surface definition and the target surface definition are surface definitions selected from a surface, a set of vertex locations, a texture implicit function, a geometry implicit function, and any combination thereof, via one of the following sets of steps:

a. providing a predetermined set of bones and a predetermined topology, and solving a minimization problem on said surface definition; thereby applying said minimization for each of said plurality of frames and finding a location of the predetermined set of bones and for at least one representative frame, said minimization providing skinning for said temporally coherent plurality of frames;

b. providing a predetermined number of bones; for each of said plurality of frames, a minimization finding constraints on the bones and on at least one representative frame, providing skinning for said temporally coherent plurality of frames; or c. predefining a measurement criterion representing a maximum difference between a surface definition after skinning and the surface definition for a deformed source frame, and, for each of said plurality of frames, minimizing the number of bones needed to generate a surface definition after skinning satisfying said measurement criterion, where the surface definition after skinning and the surface definition for the deformed source frame are selected from a surface, a set of vertex locations, a texture implicit function, a geometry implicit function, and any combination thereof.

It is another object of the present invention to disclose the method as described in any of the above, additionally comprising generating, for a temporally coherent sequence of frames, an optimized blendshape for at least a portion of said object, via one of the following steps:

a. predefining a measurement criterion to be minimized, said measurement criterion representing a difference between said optimized blendshape and a surface definition for said at least a portion of said object in said temporally coherent sequence of frames; for said temporally coherent sequence of frames, finding a set of basic shapes, for each frame in said temporally coherent sequence of frames, said optimized blendshape being a linear combination of said basic shapes, said optimized blendshapes minimizing said measurement criterion;

b. predefining a measurement criterion representing a maximum difference between a blendshape and a surface definition for said at least a portion of said object in said temporally coherent sequence of frames for said temporally coherent sequence of frames, minimizing a number of basic shapes, for each frame in said temporally coherent sequence of frames, said optimized blendshape being a linear combination of said basic shapes, said optimized blendshapes satisfying said measurement criterion; or c. providing a set of basic shapes comprising a predetermined number and shape of the basic shapes, predefining a measurement criterion representing a difference between a blendshape and a surface definition for said at least a portion of said object in each of said plurality of frames and, for each of said plurality of frames, finding said optimized blendshape as a linear combination of said basic shapes, each of said optimized blendshapes minimizing said measurement criterion.

It is another object of the present invention to disclose the method as described in any of the above, additionally comprising improving texture by, for at least one texel visible in images from a plurality of cameras, at least two of said images being from different frames, said at least one texel having a texture in each of said images, and generating texture for said at least one texel from a combination of textures for said texel from each of said images.

It is another object of the present invention to disclose the method as described in any of the above, additionally comprising improving texture by decomposing rgb data into color data and light data, and executing at least one of the following steps:

a. assuming that each texel in an object has the same albedo across frames and further assuming that the intensity and direction of light sources does not change across frames, determining the albedo of the texels by solving an optimization problem;

b. predetermining an albedo for each texel from a single frame and optimizing a member of a group consisting of a location of a surface, a normal to the surface, or any combination thereof by using differential rendering methods across frames;

c. selecting determination of a location of at least one light source from a group consisting of location known, location ignored or location variable and a temperature of said at least one light source from a group consisting of temperature known, temperature ignored, or temperature variable;

d. finding an albedo for specular texels by comparing rgb values for each texel of interest across frames; or e. determining a perceived rgb for at least one texel from measured rgb in at least two frames and finding material light properties of said at least one texel from said perceived rgb, It is another object of the present invention to disclose the method as described in any of the above, additionally comprising at least one of the following steps:

a. storing texture only for a source frame in said plurality of frames;

b. storing topology only for a source frame in said plurality of frames; or c. storing said source frame as a textured mesh.

It is another object of the present invention to disclose the method as described in any of the above, additionally comprising at least one of the following steps:

a. selecting a 3D model representation to be a signed distance field;

b. no deformation field being findable between said source frame and said target frame, selecting an intermediate frame and generating a source-intermediate deformation field between said source frame and said intermediate frame using a texture implicit function for said intermediate frame, generating an intermediate-target deformation field between said intermediate frame and said target frame, and generating a source-target deformation field from said source-intermediate deformation field and said intermediate-target deformation field; or c. generating a 3D model implicit function for said target frame from a 3D model representation of said frame, and using said 3D model implicit function as a geometry matching loss for said neural network.

It is another object of the present invention to disclose a non-transitory computer-readable medium comprising computer-executable instructions which, when executed by a computing device, cause the computing device to carry out a method for generating a temporally coherent plurality of frames in a volumetric video, the method comprising steps of:

finding a deformation field transforming a source frame of a volumetric video into a target frame of a volumetric video comprising steps of:

building a texture implicit function for said target frame;

training a neural network to generate said deformation field between said source frame and said target frame, said texture implicit function for said target frame being a texture matching loss for said neural network; and applying said deformation field to said source frame, thereby generating a deformed source frame;

selecting a plurality of frames in said volumetric video;

selecting a first source frame in said plurality of frames; and repeating the steps of finding said deformed source frame for each target frame, said finding of said deformed source frame following one of the following paths:

finding a first deformed source frame from said first source frame; and each subsequent source frame being a deformed source frame from a previous pair of frames; or each of said target frames being a deformation of said first source frame.

It is another object of the present invention to disclose the non-transitory computer-readable medium as described in any of the above, wherein the computer-executable instructions are additionally configured, when executed, to perform a step of selecting a solver for optimization from a group consisting of at least one non-linear optimizer, at least one neural network or any combination thereof.

It is another object of the present invention to disclose the non-transitory computer-readable medium as described in any of the above, wherein the computer-executable instructions are additionally configured, when executed, to perform a step of applying a solver to at least one frame of the temporally coherent plurality of frames to add metadata or improve a quality of the temporally coherent plurality of frames.

It is another object of the present invention to disclose the non-transitory computer-readable medium as described in any of the above, wherein the computer-executable instructions are, when executed, additionally configured to perform a step of generating optimized rigging and skinning, where optimization is finding locations of bones and relations between bones and a resulting surface definition that best matches a target surface definition for a deformed source frame in a plurality of target frames, where the resulting surface definition and the target surface definition are surface definitions selected from a surface, a set of vertex locations, a texture implicit function, a geometry implicit function, and any combination thereof, via one of the following sets of steps:

a. providing a predetermined set of bones and a predetermined topology, and solving a minimization problem on said surface definition; thereby applying said minimization for each of said plurality of frames and finding a location of the predetermined set of bones and for at least one representative frame, said minimization providing skinning for said temporally coherent plurality of frames;

b. providing a predetermined number of bones; for each of said plurality of frames, a minimization finding constraints on the bones and on at least one representative frame, providing skinning for said temporally coherent plurality of frames; or C. predefining a measurement criterion representing a maximum difference between a surface definition after skinning and the surface definition for a deformed source frame, and, for each of said plurality of frames, minimizing the number of bones needed to generate a surface definition after skinning satisfying said measurement criterion, where the surface definition after skinning and the surface definition for the deformed source frame are selected from a surface, a set of vertex locations, a texture implicit function, a geometry implicit function, and any combination thereof.

It is another object of the present invention to disclose the non-transitory computer-readable medium as described in any of the above, wherein the computer-executable instructions are additionally configured, when executed, to perform a step of generating, for a temporally coherent sequence of frames, an optimized blendshape for at least a portion of said object, via one of the following steps:

a. predefining a measurement criterion to be minimized, said measurement criterion representing a difference between said optimized blendshape and a surface definition for said at least a portion of said object in said temporally coherent sequence of frames; for said temporally coherent sequence of frames, finding a set of basic shapes, for each frame in said temporally coherent sequence of frames, said optimized blendshape being a linear combination of said basic shapes, said optimized blendshapes minimizing said measurement criterion;

b. predefining a measurement criterion representing a maximum difference between a blendshape and a surface definition for said at least a portion of said object in said temporally coherent sequence of frames for said temporally coherent sequence of frames, minimizing a number of basic shapes, for each frame in said temporally coherent sequence of frames, said optimized blendshape being a linear combination of said basic shapes, said optimized blendshapes satisfying said measurement criterion; or c. providing a set of basic shapes comprising a predetermined number and shape of the basic shapes, predefining a measurement criterion representing a difference between a blendshape and a surface definition for said at least a portion of said object in each of said plurality of frames and, for each of said plurality of frames, finding said optimized blendshape as a linear combination of said basic shapes, each of said optimized blendshapes minimizing said measurement criterion.

It is another object of the present invention to disclose the non-transitory computer-readable medium as described in any of the above, wherein the computer-executable instructions are additionally configured, when executed, to perform a step of improving texture by, for at least one texel visible in images from a plurality of cameras, at least two of said images being from different frames, said at least one texel having a texture in each of said images, and generating texture for said at least one texel from a combination of textures for said texel from each of said images.

It is another object of the present invention to disclose the non-transitory computer-readable medium as described in any of the above, wherein the computer-executable instructions are additionally configured, when executed, to perform a step of improving texture by decomposing rgb data into color data and light data, and executing at least one of the following steps:

a. assuming that each texel in an object has the same albedo across frames and further assuming that the intensity and direction of light sources does not change across frames, determining the albedo of the texels by solving an optimization problem;

b. predetermining an albedo for each texel from a single frame and optimizing a member of a group consisting of a location of a surface, a normal to the surface, or any combination thereof by using differential rendering methods across frames;

c. selecting determination of a location of at least one light source from a group consisting of location known, location ignored or location variable and a temperature of said at least one light source from a group consisting of temperature known, temperature ignored, or temperature variable;

d. finding an albedo for specular texels by comparing rgb values for each texel of interest across frames; or e. determining a perceived rgb for at least one texel from measured rgb in at least two frames and finding material light properties of said at least one texel from said perceived rgb, It is another object of the present invention to disclose the non-transitory computer-readable medium as described in any of the above, wherein the computer-executable instructions are additionally configured, when executed, to perform at least one of the following steps:

a. storing texture only for a source frame in said plurality of frames;

b. storing topology only for a source frame in said plurality of frames; or c. storing said source frame as a textured mesh.

It is another object of the present invention to disclose the non-transitory computer-readable medium as described in any of the above, wherein the computer-executable instructions are additionally configured, when executed, to perform at least one of the following steps:

a. selecting a 3D model representation to be a signed distance field;

b. no deformation field being findable between said source frame and said target frame, selecting an intermediate frame and generating a source-intermediate deformation field between said source frame and said intermediate frame using a texture implicit function for said intermediate frame, generating an intermediate-target deformation field between said intermediate frame and said target frame, and generating a source-target deformation field from said source-intermediate deformation field and said intermediate-target deformation field; or c. generating a 3D model implicit function for said target frame from a 3D model representation of said frame, and using said 3D model implicit function as a geometry matching loss for said neural network.

BRIEF DESCRIPTION OF THE FIGURES

In order to better understand the invention and its implementation in practice, a plurality of embodiments will now be described, by way of non-limiting example only, with reference to the accompanying drawings, wherein FIG. 1A-C schematically illustrates distortion of a grid and a deformation field for an object;

FIG. 3 shows an embodiment of a flow chart of a method of finding a between-frame deformation function; and FIG. 4 shows an embodiment of a flow chart of a method of finding between-frame deformation functions along a path between frames.

DETAILED DESCRIPTION OF THE PREFERRED EMBODIMENTS

Figures 1A, 1B:
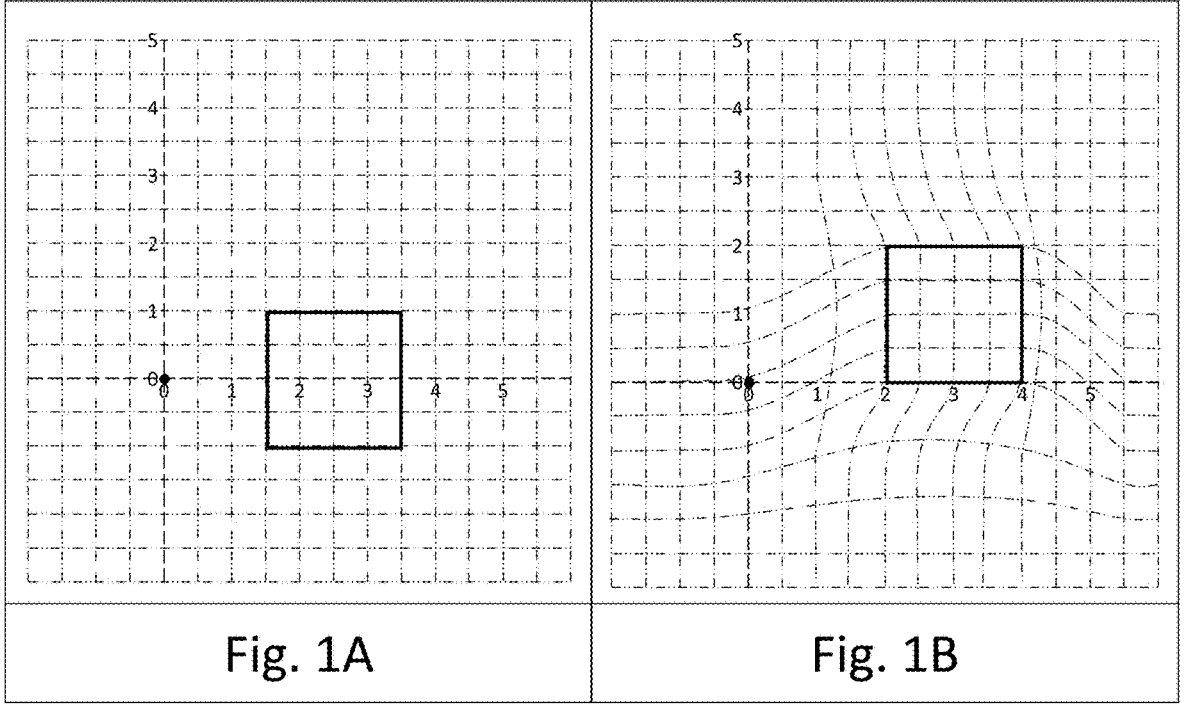

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for generating a volumetric video in which all frames are temporally coherent.

The term 'space' hereinafter refers to defined volume. For non-limiting example, if the space comprises a frame of a volumetric video, the space is the volume visible in the frame. If the space is a virtual reality system, the space is the volume within which VR objects can be placed.

The term 'overfitted' hereinafter refers to a neural network that is not used for generalization and only relates, for non-limiting example, one frame to another frame. For non-limiting example, generalizing refers to learning from the given data and applying the learnt information elsewhere; for non-limiting example, relating the first frame to a third frame different from the second (other) frame.

The term 'implicit function' hereinafter refers to a multivariate function describing a property of a space where it is not possible or it is very difficult to determine the function in closed form. In general, an implicit function is neither continuous nor differentiable. An implicit function can be, for non-limiting example, a deformation field, a signed difference field, texture, geometry, or a combination of texture and geometry. An implicit function can be generated by training a neural network.

An advantage of using an implicit function generated by a neural network to generate a deformation field is that an implicit function generated by a neural network can be differentiated. In addition, assistant functions such as, but not limited to, $\sin(x)$, $\cos(x)$, $\sin(2x)$, etc. can be defined, determined and input to the implicit function, further improving the possibility of finding a solution to the problem of determining the deformation field.

Implementing an implicit function can be done with many neural network architectures, for non-limiting example, a multilayer perceptron (MLP) feedforward neural network, a pifu architecture or a few layers of fully connected neurons. The type of neural network architecture is not germane to the patent, as long as it allows overfitting.

For simplicity, the term "implicit function" in the singular will be used herein for the one or more implicit functions that, as a set, describe the property.

It should be noted that the implicit function describing the space is continuous; input to the implicit function need not be grid points, mesh vertices, points in a point cloud, or other discrete methods of describing a geometry.

Implementing a deformation field as an implicit function can be done with many neural network architectures, for non-limiting example, a multilayer perceptron (MLP) feedforward neural network, a pifu architecture or a few layers of fully connected neurons. The type of neural network architecture is not germane to the patent, as long as it allows overfitting.

The term '3D model' hereinafter refers to everything in the space, including all objects and all derived fields. If the space comprises a frame of a volumetric video, the environment is everything within the volume defined by the video. If the space is a virtual reality system, the 3D model is the space within which VR objects can be placed. It should be noted that the type of system used to describe the 3D model, whether mesh, point cloud, Neural Radiance Field or Signed Distance Field is not germane to the patent. Any type of system used to describe the 3D model that can generate an implicit function can be used.

The term 'far outside' hereinafter refers to a location that is further outward from the surface than a predetermined outward thickness.

The term 'far inside' hereinafter refers to a location that is further inward from the surface than a predetermined inward thickness.

The term 'texture map' hereinafter refers to the means by which texture is linked to geometry. Non-limiting examples of texture maps comprise an atlas or a UV map. Colors can be described by a color only such as, for non-limiting example, an rgb value or cmy value; or by a color and a transparency. The means by which colors are described is not germane to the patent; any conventional means of describing the color can be used.

The term '3D model representation' hereinafter refers to the type of representation of the space. Typical 3D model representations comprise, but are not limited to, a mesh, voxels, a point cloud, or a NERF. The type of 3D model representation is not germane to the patent; any conventional 3D model representation can be used.

The present invention discloses a means and method for generating a volumetric video in which all frames are temporally coherent.

An object in a volumetric video or other 3D model can be described by a mesh and a texture map. The space can, for non-limiting example, be described via Neural Radiance Fields (NERF), voxels, pixels or a point cloud; texels can be used to describe the color(s) in the space or the geometric elements can also comprise a color. A NERF comprises a grid with each cell comprising a color and a transparency.

Temporal coherence occurs between two or more frames of a volumetric video when the topology of the 3D model remains the same for these frames. For a mesh and a texture map, the same index list—the list of vertices for each polygon in the mesh (typically but not necessarily a triangle) is used for all temporally coherent frames and only one texture map is needed for all of these frames.

Semantic tracking, meaning that texture originally associated with a vertex in a mesh can not become separated from the vertex, occurs for 3D models or object(s) within a 3D model if there is temporal coherence between the frames. For non-limiting example, for temporally coherent frames, a vertex that is associated with a position on a shoulder is associated to the same position on the shoulder for all of the temporally coherent frames.

For cases where there is no mesh, temporal coherence will be deemed to occur if a deformation field can be found that accurately maps texture between frames, so that there is temporal coherence between the frames linked by the deformation field.

The present invention enables temporal coherence for an entire volumetric video and, therefore, semantic tracking for the entire volumetric video; texture can not become separated from the mesh vertex, point in a point cloud or other locator to which it was originally attached. For non-limiting example, a can of soda is symmetrical about its longitudinal axis. A volumetric video can be made of the soda can rotating about its longitudinal axis in a space with walls labelled "front", "left" "back" and "right". A set of deformation fields can be generated to connect the frames of the volumetric video. If only geometry is used, the deformation fields are the trivial fields that "nothing changes". However, since the texture does change—the front of the can faces the "front" wall, then the "left" wall, and so on—if the change in texture is generated separately from the change or, in this case, non-change, in geometry, all connection between the geometry and the texture is lost. Since, in the present method, at least one of the IFs used to train the DF comprised texture, the DF implicitly comprises texture information even though its inputs and outputs are locations in space Therefore, the geometry and the texture are affected in tandem; all changes in geometric location are automatically the same as the changes in the location of the texture.

This feature enables semantic tracking throughout the entire sequence, allowing, for non-limiting example, incorporation into animation pipelines. For non-limiting example, if wings are added to a character by an animation pipeline, the wings will remain in the same place on the character throughout the sequence. Without automatic semantic tracking, as enabled by the present invention, for non-limiting example, an end of a wing could migrate down the arm or even separate from the character.

By having temporal coherence for the entire volumetric video, for a space comprising meshed objects, only one index list and only one UV mapping need be stored for the volumetric video, very much reducing the amount of storage space needed for the volumetric video and the amount of data that needs to be downloaded from storage when the volumetric video is played or inserted into another system such as, for non-limiting example, virtual reality (VR).

Other advantages include:

In many cases, only one atlas (or only a few atlases) is needed for the entire volumetric video. If none of the items in the atlas change significantly during the volumetric video, then only a single atlas is needed. If one or more of the items changes significantly, then a new atlas would be needed each time such a change occurs. A shirt is a non-limiting example of an item that does not change significantly; it does not change color (except for the effects of lighting) during the volumetric video. Removal of the shirt, on the other hand, could be an example of a need for a new atlas.

The quality of the volumetric video is better, because the topology of the 3D model is the same throughout the volumetric video.

Compression is more efficient.

It is easier to insert the volumetric video into animation pipelines, since 3D animation pipelines usually work with file formats that have one atlas and one topology. Therefore, the method of the current invention allows representation of the volumetric video in file formats such as, but not limited to, alembic or gltf,fbx that are natively supported by 3D tools such as, but not limited to, blender, unreal, or unity.

Augmentation is easier; the augmentation need only be attached to the object once.

Artifact fixing is easier since each artifact need be fixed once.

Deriving metadata, such as, but not limited to, rigging and skinning or material segmentation is easier since the derivation of the metadata need be done only once. In addition, since the volumetric video is a sequence of frames with the same topology, rigging and skinning can be done automatically because of the semantic tracking enabled by the present invention. For example, there is no need to check each frame to determine whether it has the same topology as a previous frame.

It should be noted that, if the geometry is not represented by a mesh, the temporal coherence is not as well defined but, of the advantages described above, those advantages that do not depend directly on the presence of a mesh remain. These comprise: the quality of the volumetric is better, compression is easier, insertion into animation pipelines is easier, and augmentation and artifact fixing are easier.

In the present invention, the 3D model of one frame is connected to the 3D model of a next frame by means of a deformation field, as disclosed hereinbelow.

A deformation field can be represented in many ways. Some non-limiting examples are:

A global equation.

Multiple equations that are attached to locations in space and affect nearby world points.

Sparse or dense vector fields.

A deformation field can also be represented by an implicit function.

Changes from one frame to another can be mapped via a deformation field. Deformation fields can be layered to ensure temporal coherence (see below). The implicit function can be found by using a system such as a neural network with the input being the variables and the data describing at least one property of the space and "training" the neural network to find a representation of the data such that, if a set of variables describing a point in the multivariate state is input to the representation that is the output of the neural network, the representation will describe the property of the space at that point. For non-limiting example, the multivariate space is a frame of a volumetric video and the point is a location within the frame, the output of the representation could be that the point is on the front of the shirt and that that point on the shirt is green.

In an exemplary embodiment, known in the prior art, the shape, size and location of object(s) in a space can be input into in implicit function using an SDF. The SDF comprises a continuous function where any location in the SDF comprises a signed distance, where the distance is the distance from the location to the nearest point on the nearest object and the sign gives whether the location is inside the object or outside the object, the SDF having one sign if the location is outside the object and an opposite sign if the location is inside the object. Conventionally, the sign is positive if the location is outside the object and negative if the location is inside the object, although it is possible for the sign to be negative for locations outside an object and positive for locations inside an object, as long as all parts of the system use the same sign convention.

Herein, a positive outside-negative inside convention will be used.

For each frame in the volumetric video, a neural network can be trained to find an implicit function that generates the SDF for the frame. If a neural network is used, the SDF implicit function has a location as input, with the output being the signed distance from that location to the nearest part of an object.

Implementing the SDF as an implicit function can be done with many neural network architectures, for non-limiting example, a multilayer perceptron (MLP) feedforward neural network, a pifu architecture or a few layers of fully connected neurons. The type of neural network architecture is not germane to the patent, as long as it allows overfitting.

In embodiments using an SDF, the SDF is used as a matching loss function in training a neural network to find an implicit function for the 3D model, for non-limiting example, an implicit function representing the geometry of a frame in a volumetric video. A neural network can then be trained to find a deformation field linking two 3D models, where the deformation field is a set of vectors that transforms location(s) in one frame into matching location(s) in a second frame. More than one matching loss function can be used in training the neural network. Non-limiting examples of matching loss functions comprise the SDF or the texture, each being represented as an implicit function.

The neural network training process minimizes the matching loss function by an iterative process. In embodiments where the matching loss function does not involve a texture matching loss, the deformation field that will be trained will likely not match the textures correctly in cases where there is ambiguity in the geometry matching (such as the soda can example, above). In the method of the present invention, including a texture matching loss results in a deformation field that correctly matches texture and geometry and thus preserves the relation between textures and geometry.

Since the matching loss function(s) is represented as an implicit function, which is differentiable, the gradient associated with the matching loss function can be calculated, simplifying the finding of a best deformation field, In addition, assistant functions such as, but not limited to, $\sin(x)$, $\cos(x)$, $\sin(2x)$, etc. can be defined, determined and input to the implicit function, further improving the possibility of finding a solution to the problem of determining the deformation field.

Typically, not all of the 3D model is used in the neural network; the 3D model is sampled. In some embodiments, 1000 locations are sampled. The more locations in the 3D model that are sampled, the more accurately the deformation is represented, but the more time the neural network will take to find the implicit function. The number of sampled locations can be in a range from 1000 to $10^6$.

Since a deformation field is defined in the space rather than on a topology, once a DF has been found, it is valid for the pair of frames connected by the DF, regardless of the 3D model representation used. Therefore, if temporal coherence is lost between a first frame of a pair and a second frame of a pair, often a deformation field can be generated that transforms one deformation field to the other deformation field, "layering" the deformation fields until temporal coherence has been achieved.

In some embodiments, deformation fields connect pairs of frames (k, k+1), $1 \le k \le N$. In some embodiments, deformation fields connect pairs of frames (1, k), $2 \le k \le N$. The first method is more accurate locally—the DF more accurately reproduces the second frame, but small errors tend to accumulate over time, so the solutions "drift away" from the desired solution. The second method is less accurate locally, but the small errors can not accumulate, preventing drifting.

Therefore, both local and overall accuracy can be improved by combining the two sequences by finding a set of deformation fields that is a function of the deformation fields generated by the two methods. For non-limiting example, the function can be an average of the DFs of the two methods.

This process is repeated for all pairs of frames (R, k), $1 \le k \le R-1$, $R+1 \le k \le N$, where R is the number of the reference frame and N is the number of frames in the volumetric video. Therefore, since the locations are topologically the same in each frame, the volumetric video is temporally coherent and the geometry of space in all of the frames can be generated from the geometry of space in the first frame.

The layered deformation fields can be found between the representative frame R and other frames k as described above, the deformation field can be found between frames k and frames k+1, so that the process is repeated for all pairs of frames (1, k), $2 \le k \le N$, where N is the number of frames in the volumetric video, or both.

In some cases, the process of determining deformation fields can be speeded up by initializing the deformation field with an initial guess derived from, for non-limiting example, feature tracking or optical flow methods.

An important characteristic of a good representative frame is that as many surfaces as is practical are visible for at least one object of interest.

In some embodiments, the first frame(s) of the volumetric video are configured to provide one or more representative frames. In these initial frames, the one or more objects of interest are posed in one or more predetermined poses, where the predetermined poses are configured to allow visibility of as many surfaces as is practical, thereby minimizing occlusions in the objects of interest.

For non-limiting example, if the object of interest is a person, a representative frame could show a person in a T pose with the mouth open, where, in a T pose, the person stands upright with legs together and arms extending outward at approximately 90° to the body. In this case, a volumetric video of the person could start with the person standing in a T-pose and the representative frame could be the first frame or another frame showing the person in the T pose.

Another non-limiting pose comprises an A pose, which differs from the T pose in that the arms are at approximately 45° to the body. Any pose that exposes a large fraction of the surface of the object can be used; the type of pose is not germane to the patent.

Another non-limiting example is a manual or automatic analysis of the volumetric video and selection of a "best" frame, where a best frame is one where, as described above, the maximum number of surfaces is visible.

Yet another non-limiting example is to pick a small number of frames, create temporally coherent sequences from each frame, as described below, and combine the temporally coherent sequences.

For non-limiting example, the selected frames could be the first frame and the last frame, with one temporally coherent sequence connecting frame 1 to all subsequent frames and another temporally coherent sequence connecting frame N to all previous frames.

Figure 1C:
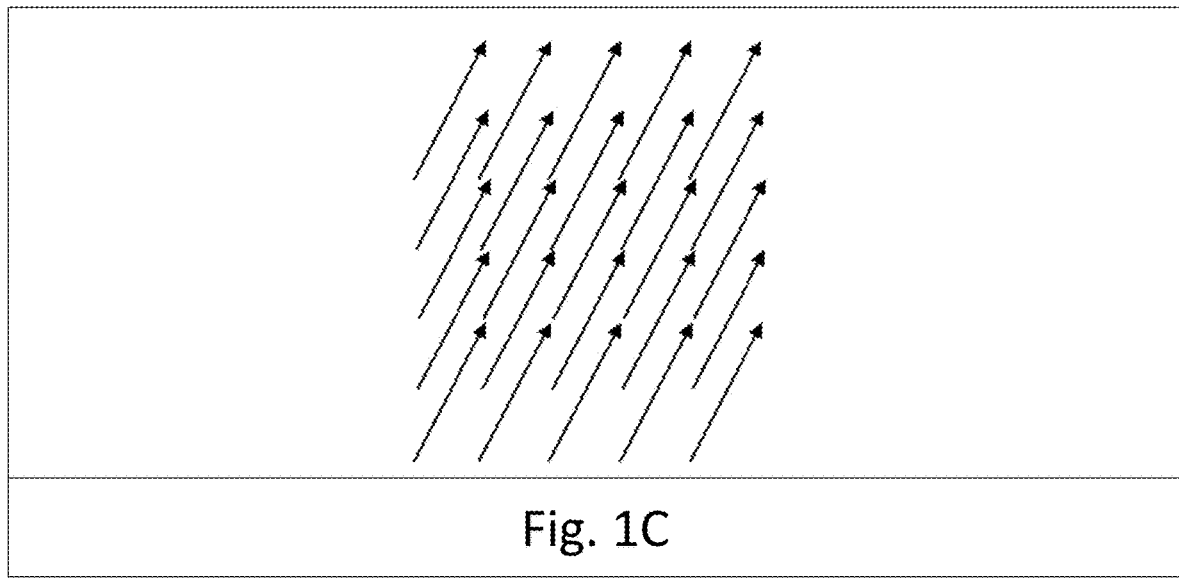

FIG. 1A-B shows a non-limiting example where the 2D space is meshed, with the mesh vertices moving between frames. In this example, a 2×2 square is inserted into a first frame with its center at (2,5). In the second frame, the center of the square is at (3,1) on the original grid. The square remains attached to the same vertices and the vertices have moved. The movement for the vertices in the square itself will be the vector (0.5, 1). A deformation field for the square itself is shown in FIG. 1C.

The above procedure is an example of a method known in the art for generating geometry for objects in frames and for relating the geometry of one frame to that of the next frame. Other methods are also known in the art. Whichever method is used, what is new in the present invention is including texture as an implicit function in the training of the deformation field(s).

In the prior art, typically, the geometry, the texture map and the connectivity between the geometry and the texture map can change frame-to-frame or after a few frames and the texture map can change at a different frame from a frame where the geometry changes, thereby increasing the amount of storage needed for the volumetric video and increasing the probability of mismatch between the texture of one frame and the texture of a next frame.

In an embodiment of the present invention, the above method can be used to generate a texture implicit function that can be used as a matching loss function in finding a between-frame deformation field.

For a deformation field comprising transforming texture, a texture implicit function for each frame is generated as disclosed above, with implicit functions found for each frame, with the texture implicit function used as a matching loss function to generate frame-to-frame deformation.

The texture implicit function is typically found using an overfitted neural network, although other methods can be used, as described above. The input to the implicit function is a location and the output is the color of that location. For non-limiting example, the input can be a Cartesian location (x,y,z) and the output can be an rgb color (r, g, b).

If a combined geometry/color implicit function is used, then the input is a location, such as a Cartesian location $(x_1, y_1, z_1)$ and the output is a location $(x_2, y_2, z_2)$ and a color, such as, but not limited to, (r, g, b).

Typically, the color is an rgb value, although other methods of representing the color such as YUV (or YCbCr), Y'UV or rgba can be used.

For locations at or near the surface of an object, the output color is the color of the object; other locations can be given the color "transparent" or "no color". In some embodiments, the surface is given an outward thickness and an inward thickness to smooth the transition from inside to surface and surface to outside so that minor irregularities in the surface do not cause visible jumps in the color of the surface, especially as the surface distorts as the object moves. A location far outside the surface is one that is further outward from the surface than the outward thickness and a location far inside the surface is one that is more than an inward thickness from the surface.

For locations far outside the surface of the object, the color value indicates "transparent" or "no color". The no color value can be any predetermined value, as long as it indicates that the locations is not colored. Typically, the no color value is (0,0,0), but it can be any predetermined value, for non-limiting example, (1000,1000,1000) or (−1, −1, −1). In some embodiments, negative values indicate that the location is far inside an object, while (0,0,0) indicates that the location is far outside the object. This "fuzzy" surface (nearer to the surface than the predetermined distance(s)) can correct for small irregularities in the surface.

Locations near the surface can have the same color value as a locations on the surface. Preferably, locations within the inward thickness and within the outward thickness will transition from the surface color to the no-color value as they are found less close to the surface itself.

The inward thickness and the outward thickness can be the same size or different sizes.

"Near" and "far" can be defined, for non-limiting example, in relation to the size of the object, the dimensions of pixels near the surface, the relative size of the object in the environment (for non-limiting example, frame for video, world for VTR), or the expected size of irregularities.

For a texture-only or combined geometry/texture neural network, for each pair of frames (R, k), $1 \le k \le R-1$, $R+1 \le k \le N$, where R is the number of the reference frame and N is the number of frames in the volumetric video, the neural network finds an implicit function that generates a deformation field such that, for any location $(x_1, y_1, z_1)$ in a first frame with color $(r_1, g_1, b_1)$, the deformation field generates a location $(x_2, y_2, z_2)$ in the second frame such that, if the location $(x_2, y_2, z_2)$ is input into the second implicit function, the output is the color $(r_1, g_1, b_1)$. This can be written as:

input $(x_1, y_1, z_1) \rightarrow$ IF1 with output $(r_1, g_1, b_1)$
input $(x_1, y_1, z_1) \rightarrow$ DF with output $(x_2, y_2, z_2)$
input $(x_2, y_2, z_2) \rightarrow$ IF2 with output $(r_1, g_1, b_1)$ It should be noted that all the techniques heretofore used for the geometry-only NN, e.g., to generate the SDF, to generate or differentiate implicit functions, or to train neural networks can be used for the texture only or for the combined geometry and texture. Such techniques comprise generating and differentiating texture implicit functions, and training the neural network to find a deformation field where the input is the geometry for the first frame and the output is the texture or texture and geometry for the second frame.

Using this method, the locations that have a color (are not no-color) are, in every frame, necessarily within the thickness of the geometric surface of each object in the space, since the color and the geometric location are attached to each other and are generated by the same distortion field.

In some embodiments, the system further comprises semantic fields, in other words, locations on an object can have a type. Non-limiting examples of types on a human could comprise arm, leg, finger, toe, head, hair, eye, nose, mouth, ear, torso, shirt, trousers, belt, shoe, sock, ring or watch. The semantic types into which the object is divided and how the object is divided into its semantic types are known in the art and are not germane to the patent.

It should be noted that the type is usually inferred from the texture and the geometry so that, if a texture remains attached to a vertex, then, in all practical setups, the type also does. Therefore, in practice, if semantic tracking of texture occurs, so will semantic tracking of types.

When semantic fields are used, an implicit function is found for the semantic of the 3D model representation, with the implicit function having input (x,y,z) and output (type).

The semantic implicit function is then used as a matching loss in the neural network training the deformation field.

Use of semantic fields can improve the fidelity of the match between the deformed representative frame and the target frame, since it can help prevent points with the same color but with geometric ambiguity from being matched incorrectly. For non-limiting example, a person may be wearing a red shirt and red trousers with the shirttails outside the trousers. In a reference frame, the shirttails could be lying flat along the trousers whereas, in a target frame, the shirttails could be separated from the trousers, flying outward because the person is rotating. If there is no semantic tracking of types, the deformation field could deform the reference frame with a part of the shirttail missing, as the deformation field had deemed that part of the shirttail to be part of the trousers.

In some embodiments, implicit functions for changes in lighting can also be used. The deformation needs to match textures as well as geometry between frames and changes in lighting can affect the colors in those frames, rendering the matching problematic. For non-limiting example, if the front of a white shirt is illuminated by a white light in a representative frame and is illuminated by a red light in a second frame, it will be very difficult, if not impossible, to find a deformation field between those two frames, as the implicit function for the first frame will describe points on the front of the shirt as being white, whereas the implicit function of the second frame will describe the points on the front of the shirt as being red. Therefore, the neural network, in training the deformation field, must "know" that point $(x_1, y_1, z_1)$ must map to point $(x_2, y_2, z_2)$ even though point $(x_1, y_1, z_1)$ has color (0,0,0) and point $(x_2, y_2, z_2)$ has color (256, 0, 0).

To solve this, the lighting part of the color is encoded as a separate implicit function and is used by the neural network as a separate loss.

Any member of a group consisting of geometry, texture, lighting, camera viewpoint, and any combination thereof can be encoded as an implicit function and be used as a matching loss function in training a neural network.

Additional features that can be included in embodiments of the invention comprise automatically performing at least one of rigging, skinning and blendshape decomposition (RSB) for at least one object in the 3D model. This will enhance the ability to insert the volumetric video into animation tools that can only receive data in this format.

As is known in the art, rigging comprises inserting at least a part of a skeleton into an object, while skinning is assigning a relationship between a mesh and the skeleton.

As is known in the art, blendshapes are a common method of representing facial movements and, in some cases, can be used to represent body movements. In this technique, different facial expressions are encoded in terms of mesh vertex positions and then the different facial expressions can be moved, combined or both in order to generate facial expressions in the object. For non-limiting example, an object could be given the facial expression 0.3*smile+ 0.3*surprised+0.4*excited. The blendshapes can be viewed as "eigenvectors" of facial expressions and need not, and often do not, correspond to "named expressions" such as, but not limited to a smile, a frown, a grimace, or thoughtfulness.

If the volumetric video is temporally coherent, then adding RSB can be treated as an optimization problem, in other words, the problem of finding the location and texture of the RSB that minimizes the difference between the resulting surface and the volumetric video.

Temporal coherence of the mesh is important since, for non-limiting example, skinning of an object or adding blendshapes to an object will affect the triangles (or other polygons) and/or the vertices of the surface. If the triangles, vertices or both change every few frames, there are too many variables and not enough equations to solve the optimization problem. If the volumetric video is temporally coherent, then the triangles (or other polygons) and/or the vertices of the surface remain the same for all of the temporally coherent frames, very much reducing the number of variables and thereby making the optimization problem solvable.

Typically, optimization is done for a plurality of temporally coherent frames. Although the minimum number of frames is two, typically, the plurality of temporally coherent frames comprises at least three frames. The minimum number of frames can be 2, 3, 10 or 100. The maximum number of frames in the optimization would be the total number of frames in the volumetric video. In practice, the more frames included in the optimization, the more accurate the optimization is, but the longer the time taken to determine an optimum. Therefore, the number of frames included in the optimization will typically be less than 1000.

Frames in the plurality of temporally coherent frames need not be sequential, nor need they be selected from any particular part of the volumetric video. For non-limiting example, frames can be selected from an early part of the volumetric video, from a central part of the volumetric video, from a later part of the volumetric video, or any combination thereof. Frames can be, for non-limiting example, every nth frame, $1 \leq n \leq N/2$, where N is the total number of frames in the volumetric video, a set of frames nk, where k is the number of the most recent claim selected and n is a multiplier (e.g., if n=10 and k=5, then the first three frames would be frames 5, 50, 500), a random selection, or any other means of selection. The means of selection is not germane to the patent.

In some embodiments, the first frame of the plurality of frames used for optimization is a representative frame.

Rigging and Skinning

For rigging, the skeleton can be defined by a number of bones, by a bone topology or by constraints on the bones, and by the lengths of the bones. The bone topology prescribes the connectivity of the bones, in other words, a constraint forcing the end of one bone to connect to the beginning of another bone, while the constraints on the bones prescribes where a given bone can or cannot move relative to other bones near it.

For non-limiting example, for rigging, a human skeleton comprises 53 bones and, for non-limiting example, the humerus (upper arm bone) is connected at one end to the radius and ulna and, at the other end, to the scapula. (In some cases, the radius and ulna are simplified into a single lower arm bone that is connected at one end to a wrist bone and, at the other end, to a humerus.)

In some embodiments, the topology and number of bones is given (e.g., 53 bones and the connectivity of human skeleton) and the location of the bones is found by solving a minimization problem on the location of the vertices in the surface mesh. Once an optimized skeleton is found, skinning can be done, as described below.

In some embodiments, only the number of bones is predefined, but the constraints on the bones are not. In other words, the optimization itself determines what the constraints on the bones are.

For non-limiting example, the optimization could determine that a bone functions as a phalange (finger or toe bone) constrained by another bone only at one end.

In some embodiments, the minimum distance, after skinning, between the result vertices and the input vertices is defined and the number of bones is a variable to be minimized. Typically, for an object of a size on the order of the size of a human, an average of the distances between the input vertices and the result vertices is kept to less than 5 cm. For a somewhat extreme non-limiting example, if a model has 6 vertices and the distances between the input and result vertices are 10 cm, 1 cm, 0.5 cm, 1 cm, 0.7 cm and 1.6 cm, the average of the distances is 2.3 cm and the skeleton is of acceptable quality.

The minimization problem can be solved by at least one non-linear optimizer or by at least one neural network. Many types of non-linear optimizer are known in the art; the type of non-linear optimizer as well as the type of neural network is not germane to the patent.

Typically, skinning comprises assigning to each vertex on the surface a relationship between the vertex and the underlying bones, where the relationship describes how much movement of each underlying bone affects movement of that vertex. Typically, there will be a limit on the number of bones a vertex can be in a relationship with. Typically, no vertex will be in a relationship with more than four bones.

For non-limiting example, the location of a vertex near the elbow will be affected by movement of the humerus and of the lower arm bone(s). If the vertex is at the bend in the elbow, approximately half of the movement of the vertex will be due to movement of the lower arm bone(s) and approximately half will be due to movement of the humerus, with no contribution from, for example, movement of the head or lower leg bone. Conceptually movement of the vertex=50% (lower bone movement)+50% (upper bone movement)+0% (head movement)+0% (leg movement). For a vertex near, but not at, the bend of the elbow and the shoulder, movement of the vertex could be 30% (lower bone movement)+70% (upper bone movement)+0% (head movement)+0% (leg movement).

Blendshapes

Similarly, blendshapes can be found by minimization.

As described above, a blendshape is a weighted combination of a set of basic shapes, typically, but not always, used to generate facial expressions. As a very simple non-limiting example, a set of basic expressions could comprise two basic expressions, "eyes open" and "eyes closed". Conceptually, if the object is very sleepy, the expression could be 10%"eyes open"+90%"eyes closed", with the eyes open only a little. A sneer might be 30% "smile"+60% "angry"+10%"contempt".

The basic shapes need not be known expressions like "smiling" or "sad"; they could be, for non-limiting examples, a set of shapes that enable the creation of realistic expressions with the fewest basic shapes; a set of shapes that enable generation of very accurate replicas of observed expressions; or a set of shapes that work well with partially-obscured or somewhat-distorted input.

Typically, a blendshape is found for each object of interest in each frame.

A measurement criterion is selected, the measurement criterion limiting a difference between a solver result and the frame (or the object or portion thereof in the frame) to be matched. Non-limiting examples of a measurement criterion are a maximum size for an averaged difference between a surface definition output by the solver and the surface definition for a deformed source frame, a maximum size for an average square of difference between a surface definition output by the solver and the surface definition for a deformed source frame, or a maximum difference between a surface definition output by the solver and the surface definition for a deformed source frame. Many other measurement criteria are possible; the type of measurement criterion selected is not germane to the patent.

In some embodiments, a set of basic shapes is provided comprising a predetermined number of blendshapes, each with a predetermined shape, and the optimization finds a blendshape as a linear combination of the basic shapes, the optimization minimizing the difference between the blendshape and a surface definition of the deformed frame according to a minimization criterion such as, but not limited to, the measurement criteria described above.

In some embodiments, a set of basic shapes is provided and the number of basic shapes in a blendshape is minimized, while keeping the quality of the resulting blendshape above a predetermined minimum, using a measurement criterion as described above. The optimized blendshape is typically a linear combination of the basic shapes. Typically, the maximum number of basic shapes in a blendshape is 10. Typically, the set of basic shapes is generated from expressions (or positions) at the beginning (or end) of the volumetric video. In less-preferred embodiments, the set of basic shapes is provided separately, such as from a set of basic shapes generated separately.

In some embodiments, a set of basic shapes is provided, typically by having, at the beginning of the volumetric video, a model (or other object) providing the members of the set of basic shapes.

For non-limiting example, facial expressions can be presented at the beginning of a volumetric video; non-limiting examples of facial expressions could be a smile, frown, angry look, etc. It is well-known how to identify a set of basic shapes from such a series of expressions. Then, for each frame of interest in the volumetric video, a solver finds the blendshape, the linear combination of basic shapes, that best satisfies a measurement criterion (such as, but not limited to, those described above) between the blendshape and the original object or portion thereof.

Texture Improvement from Multiple Frames:

In the prior art, each frame had texels and each texel had rgb data derived from no cameras, one color camera or a plurality of color cameras, with no connection between the texels of different frames. Typically, the cameras are rgb cameras.

In the case of no cameras (occlusions), the data had to be invented, by any of a number of methods, for non-limiting example, by extending the color of neighboring texels into the occlusion.

In the other cases, the rgb data was selected from the data of the camera or cameras with respect to spatial continuity, temporal continuity or both.

With temporal continuity, each texel can be tracked across frames and rgb data from different frames can be combined so that the number of occluded texels (texels viewed by 0 cameras) is significantly reduced since, as the objects move, different locations in the 3D model become visible.

Combining texture from different texels can be, for non-limiting example, by an average of the textures, by a weighted average of the textures, by super resolution, by majority vote, or by a scoring mechanism. The exact method by which textures are combined is not germane to the patent.

If frames are congruent, e.g., there is temporal coherence between frames, rgb data can be improved by using super resolution methods, or by decomposing rgb data into color data and lighting data. In both cases, for each texel of interest, the rgb data can be analyzed and combined not only per frame, but across frames. A number of frames can be selected.

In super-resolution, for each texel of interest, data from all of the cameras that view the texel of interest is combined, for non-limiting example by averaging, to get a more accurate and more consistent color for the texel, since a larger number of cameras are looking at the same surface at different angles as the surface is located in different places and at different angles in the different, but now congruent, frames.

In decomposition methods, for all of the cameras that view each texel of interest, the rgb data are decomposed into light data and color data. Typically, this is done in one of two ways:

1. It is assumed that the lighting is constant; each light source has a fixed intensity and a fixed direction relative to the space. With this assumption, a solver such as but not limited to a neural network can determine the light intensities and directions for each light source and can therefore also determine the intrinsic color of the texel. Conceptually, the light sources are determined and then the effects of the different camera angles with respect to the object can be subtracted from the observed color to determine an intrinsic color for each texel.

2. An intrinsic color of each texel of interest is known a priori, so that the normal to the surface can be found.

Relighting

Color on the surface is composed of the inherent color (albedo) and illumination effects on the color. The illumination effect is determined by the location of the light, the light color (or "temperature") and the surface location and normal.

With temporal coherence, the same surface (with the same albedo) is viewed in different positions under the same light sources, assuming the light sources do not change.

In some embodiments, the albedo of the texels can be determined by solving an optimization problem.

In some embodiments the albedo of the texels is known, for non-limiting example from a neural network that gets a single frame and outputs an albedo and the RGB data is used to optimize the location and normal of the surface, improving the geometry of the object, by using differential rendering methods.

The light sources and temperatures can be known, can be ignored or can be variables.

Specularity is a relationship between the intensity of the light source, the reflectivity of the surface, the location of the surface relative to the light source, the angle between the light source and the normal to the surface and the angle between the normal to the surface and the camera. Specularity is usually identifiable as a sudden, drastic color change in one or more texels, usually lasting for only a short time and either disappearing or moving as the object moves relative to the lighting.

The quality of the model can be improved by removing specularity in the original volumetric video. Methods of treating specularity can comprise: (1) Ignoring it, so that the specularity seen in a new environment will comprise the original specularity. (2) Determine specularity from the environment. For non-limiting example, once the locations and directions of the light sources are known and the surface normal of the object are known, it is possible to calculate the locations of specular reflection and then remove the specularity. (3) Compare the frame with other temporally coherent frames and remove the specularity by changing to color of the specular texels to the color of the same texels in a frame where there is no specular reflection.

In some embodiments, specularity can be added to a model during insertion of the model into an environment.

Texture can be improved by decomposing said rgb data into color data and light data, and:

a. Assume that each texel in an object has the same albedo across frames and that the lighting does not change across frames. The albedo of texels can then be determined by solving an optimization problem.

b. Select a single frame and determine, from that frame, an albedo for texels of interest. Optimize a member of a group consisting of the location of the surface, a normal to the surface and any combination thereof by using differential rendering methods across frames. If the normal to the surface is used in a normal map, the location of the surface is not changed.

c. Select determination of a location of at least one light source from a group consisting of location known, location ignored or location variable and a temperature of said at least one light source from a group consisting of temperature known, temperature ignored, or temperature variable;

d. Find an albedo for specular texels only, for non-limiting example, the albedo can be detected by taking the minimum of the rgb data over time and then modifying the albedo according to special considerations; or e. Determine a perceived rgb for texels of interest from measured rgb in at least two frames and find material light properties of the texels of interest from the perceived rgb.

When the albedo of the texel is known, the material light properties of the texel can be inferred from the perceived rgb, as found from temporal coherence. The material light properties are important for inserting the model into a 3D environment.

Texture can be stored only for a source frame.

Topology can be stored only for a source frame.

Preferably, the source frame is stored as a textured mesh.

Figure 2:
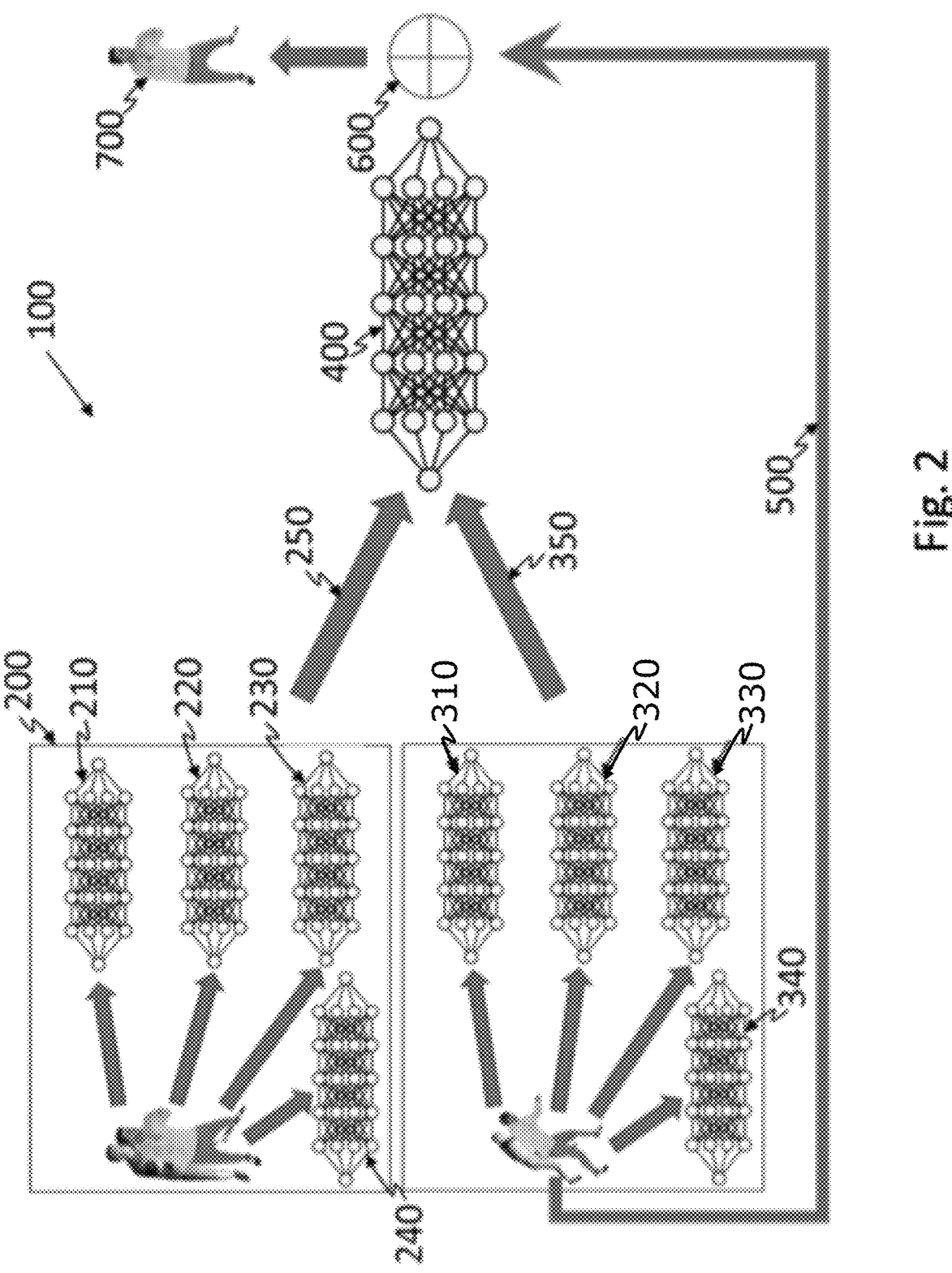
FIG. 2 schematically illustrates an embodiment of an overview of a process of finding a deformed source frame.

FIG. 2 schematically illustrates an overview of the process (100) as described herein. In the example of FIG. 2, geometry, texture, lighting and semantics are all used to find a deformed reference frame that is equivalent to the target frame. In some embodiments, other types of descriptor can be used; in general, at least two descriptors are used, most commonly geometry and texture.

The process (100) operates on a pair of frames, a reference (undeformed) frame (300) and a target (deformed) frame (200). Note that the reference frame of the pair need not be a reference frame for the entire volumetric video; for non-limiting example, if the generation path is a (k, k+1) path, the reference frame will be a frame k rather than always being the same frame.

For both the reference frame (300) and the target frame (200), the geometry (250, 350) (or other 3D object representation) and texture (260, 360) are stored separately. For both the reference frame (300) and the target frame (200), neural network representations are found. In the example shown, for the geometry, an SDF neural network representation (210, 310) is found, as well as, for the texture, a color field neural network representation (220, 320), for the lighting, a light field neural network representation (230, 330), a semantic field neural network representation (240, 340), and other field neural representations, as appropriate.

The SDF neural network representation (210, 310), color field neural network representation (220, 320), light field neural network representation (230, 330), semantic field neural network representation (240, 340), and possibly other field neural network representations are used as input (250, 350) to a deformation field neural network representation, thereby generating a deformation field (400) for the reference frame. Typically, the texture (220, 320), lighting (230, 330), semantics (240, 340), and other fields are used by the neural network as matching loss functions in training the deformation field (400); the geometry neural network representation (210, 310) is typically input as a matching loss function, but need not be.

The deformation field (400) is then applied to (500) the texture (360) and geometry (350) of the reference frame (300), the texture comprising the effects of the color, light and semantics, thereby generating (600) a deformed reference frame (700) that is equivalent to the target frame (200).

FIG. 3 shows a flow chart of a method of finding (1100) a between-frame deformation function. The method comprises building (1105) a texture implicit function for a target frame and training (1110) a neural network using the texture implicit function for the target frame as a matching loss function. The training can also comprise use of matching loss functions for lighting, SDF, semantics or any combination thereof.

FIG. 4 shows a flow chart of a method of finding (1200) between-frame deformation functions along a path between frames, where the target frames in the path preferably comprise at least a large number of the frames in the video. In preferred embodiments, the target frames plus an initial frame will comprise all of the frames in the video. In some embodiments, all of the frames except for a limited number of introductory frames will comprise all of the frames in the video. The method (1200) comprises creating a generation path (1205) by selecting a representative frame R and a propagation path between pairs of frames, the propagation path comprising all of the frames in the video except for an initial representative frame, which need not be a first frame in the video and possibly except for a small number of introductory frames or a small number of terminal frames.

The method of FIG. 4 (1100) is then applied (1210) to all of the frames along the path, starting from the representative frame. In some embodiments, if the 3D model representation of the frames does not comprise mesh(es) for object(s) in the frames, for a representative frame, the objects in the representative frame can be represented by a textured mesh by transforming the initial representation to a textured mesh by known algorithms such as, but not limited to, matching cubes. The type of algorithm used to generate the textured mesh is not germane to the patent; any commercially-available or proprietary algorithm for generating a textured mesh from a 3D model representation without a mesh can be used. Then the deformation fields can be used to generate temporally coherent meshes for the rest of the frames. This enables the volumetric video to be saved and/or downloaded using a mesh-and-texture representation.

In addition, for embodiments where object(s) are described by a mesh, for each object in the 3D model, the object's mesh need only be saved (or downloaded) once; the same mesh can be used for all frames. If there is more than one source frame, the mesh may need to be saved (or downloaded) once for each source frame, where the source frame is the first frame of a temporally coherent series of frames. The connectivity of the mesh(es) also only needs to be saved (or downloaded) once, or once per source frame, since the connectivity does not change between frames. If an atlas is used, the connectivity between the mesh(es) and the atlas(es) may need to be stored more than once, but will still only need to be saved a few times. Thereafter, the deformation field is stored (and downloaded). This is unlike the present system where objects in the frame are remeshed every frame or every few frames and, every time objects are remeshed, a new connectivity between vertex number, polygon and color must be saved.

Therefore, volumetric video that has temporal coherence can be represented with less data than volumetric video without temporal coherence. For non-limiting example, if the volumetric video is represented as a mesh, as described above, we do not need to save or transmit (or both save and transmit) the topology and atlas multiple times; the amount to be saved or transmitted can be $\frac{1}{20}^{th}$ to $\frac{1}{30}^{th}$ the amount to be saved or transmitted in the prior art.

Therefore, in addition to the advantages described above, the method of the present invention allows for much faster transmitting, making the downloading of 3D video practical on much slower devices (e.g., practical downloading of 3D video to cellphones), or enabling a higher frame rate (e.g., for smoother movement), or enabling a denser mesh (allowing finer details or more accuracy in the objects).

In some embodiments, a single 3D model is transmitted along with the deformation fields that connect the frames, with the deformation fields activated on the client (for non-limiting example, the cell phone). This further reduces the data transmitted per volumetric video since, typically, a DF is represented with a relatively small number of bytes.

The invention claimed is:

1. A method for finding a deformation field transforming a source frame of a volumetric video into a target frame of a volumetric video comprising steps of:

building a texture implicit function for said target frame;

training a neural network to generate said deformation field between said source frame and said target frame, said texture implicit function for said target frame being a texture matching loss for said neural network; and no deformation field being findable between said source frame and said target frame, selecting an intermediate frame and generating a source-intermediate deformation field between said source frame and said intermediate frame using a texture implicit function for said intermediate frame, generating an intermediate-target deformation field between said intermediate frame and said target frame, and generating a source-target deformation field from said source-intermediate deformation field and said intermediate-target deformation field.

2. The method of claim 1, additionally comprising at least one of the following steps:

a. selecting said 3D model representation to be a signed distance field;

b. generating a lighting implicit function for said target frame, and using said lighting implicit function as a lighting matching loss for said neural network; or c. generating a semantics implicit function for said target frame, and using said semantics implicit function as a semantics matching loss for said neural network.

3. The method of claim 1, additionally comprising steps of generating a 3D model implicit function for said target frame from a 3D model representation of said frame, and using 3D model implicit function as a geometry matching loss for said neural network.

4. The method of claim 1, additionally comprising steps of:

selecting a generation path, said generation path comprising:

a representative frame R; and a propagation path between pairs of frames (source frame k, target frame k) where target frame k of a frame in said generation path becomes source frame k for a next frame in said propagation path; and applying the method for finding a deformation field transforming a source frame of a volumetric video into a target frame of a volumetric video to each pair of frames on said generation path.

5. The method of claim 4, additionally comprising at least one of the following steps:

a. said propagation path comprising a member selected from a group consisting of R-frame propagation where R frame propagation is propagation from representative frame R to all other frames, or moving propagation where moving propagation is propagating (representative frame R to frame n1), propagating (frame n1 to frame n2) and repeating propagation (frame nx to frame ny) until all frames are linkable, no two of said at least one generation path having both the same representative frame R and the same propagation path;

b. having a plurality of generation paths, and for each of said target frame k in said volumetric video, using the deformation fields from said plurality of generation paths having said target frame k to find an averaged deformation field having said target frame k, thereby generating an averaged volumetric video;

c. for a 3D object representation not comprising a mesh, for said representative frame R; applying an algorithm configured to generate a textured mesh for each object in said 3D object representation of R, and transforming said texture and said mesh of said representative frame R into texture and mesh for all other frames in said volumetric video via said source frame k-target frame k deformation fields;

d. storing topology only for representative frames.

6. The method of claim 4, additionally comprising a step of storing texture only for representative frames.

7. The method of claim 4, additionally comprising a step of selecting said representative frame R from frames comprising a characteristic selected from a group consisting of: a frame comprising a predetermined object, a frame comprising a predetermined pose, a predetermined frame in said volumetric video, or any combination thereof.

8. The method of claim 4, additionally comprising steps of storing or downloading said volumetric video as a frame-and-deformation field file, said frame-and-deformation field file comprising all between-frame deformation fields and, for each of said generation path, storing topology and texture for representative frame R.

9. The method of claim 4, additionally comprising a step of storing said representative frame as a textured mesh.

10. A non-transitory computer-readable medium comprising computer-executable instructions which, when executed by a computing device, cause the computing device to carry out a method for finding a deformation field transforming a source frame of a volumetric video into a target frame of a volumetric video, the method comprising steps of:

building a texture implicit function for said target frame;

training a neural network to generate said deformation field between said source frame and said target frame, said texture implicit function for said target frame being a texture matching loss for said neural network; and no deformation field being findable between said source frame and said target frame, to select an intermediate frame and generate a source-intermediate deformation field between said source frame and said intermediate frame using a texture implicit function for said intermediate frame, generate an intermediate-target deformation field between said intermediate frame and said target frame, and generate a source-target deformation field from said source-intermediate deformation field and said intermediate-target deformation field.

11. The non-transitory computer-readable medium of claim 10, wherein the computer-executable instructions are additionally configured, when executed, to perform at least one of:

a. select said 3D model representation to be a signed distance field;

b. generate a 3D model implicit function for said target frame from a 3D model representation of said frame, and use said 3D model implicit function as a geometry matching loss for said neural network; or c. generate a semantics implicit function for said target frame, and use said semantics implicit function as a semantics matching loss for said neural network.

12. The non-transitory computer-readable medium of claim 10, wherein the computer-executable instructions are additionally configured, when executed, to generate a lighting implicit function for said target frame, and use said lighting implicit function as a lighting matching loss for said neural network.

13. The non-transitory computer-readable medium of claim 10, wherein the computer-executable instructions are additionally configured, when executed, to:

select a generation path, said generation path comprising:

a representative frame R; and a propagation path between pairs of frames (source frame k, target frame k) where target frame k of a frame in said generation path becomes source frame k for a next frame in said propagation path; and apply the method for finding a deformation field transforming a source frame of a volumetric video into a target frame of a volumetric video to each pair of frames on said generation path.

14. The non-transitory computer-readable medium of claim 13, wherein the computer-executable instructions are additionally configured, when executed, to perform at least one of:

a. said propagation path comprising a member selected from a group consisting of R-frame propagation where R frame propagation is propagation from representative frame R to all other frames, or moving propagation where moving propagation is propagating (representative frame R to frame n1), propagate (frame n1 to frame n2) and repeat propagation (frame nx to frame ny) until all frames are linkable, no two of said at least one generation path having both the same representative frame R and the same propagation path;

b. have a plurality of generation paths, and for each of said target frame k in said volumetric video, use the deformation fields from said plurality of generation paths having said target frame k to find an averaged deformation field having said target frame k, thereby generating an averaged volumetric video; or c. for a 3D object representation not comprising a mesh, for said representative frame R; apply an algorithm configured to generate a textured mesh for each object in said 3D object representation of R, and transform said texture and said mesh of said representative frame R into texture and mesh for all other frames in said volumetric video via said source frame k-target frame k deformation fields;

d. store topology only for representative frames.

15. The non-transitory computer-readable medium of claim 13, wherein the computer-executable instructions are additionally configured, when executed, to store texture for representative frames only.

16. The non-transitory computer-readable medium of claim 13, wherein the computer-executable instructions are additionally configured, when executed, to select said representative frame R from frames comprising a characteristic selected from a group consisting of: a frame comprising a predetermined object, a frame comprising a predetermined pose, a predetermined frame in said volumetric video, or any combination thereof.

17. The non-transitory computer-readable medium of claim 13, wherein the computer-executable instructions are additionally configured, when executed, to store or download said volumetric video as a frame-and-deformation field file, said frame-and-deformation field file comprising all between-frame deformation fields and, for said generation path, store topology and texture for representative frame R.

18. The non-transitory computer-readable medium of claim 13, wherein the computer-executable instructions are additionally configured, when executed, to store said representative frame as a textured mesh.

* * * * *